US012531883B2

(12) United States Patent
Devane et al.

(10) Patent No.: US 12,531,883 B2
(45) Date of Patent: Jan. 20, 2026

(54) IDENTIFICATION OF MALICIOUS CONTENT IN OPERATING SYSTEM CLIPBOARD

(71) Applicant: McAfee, LLC, San Jose, CA (US)

(72) Inventors: Oliver G. Devane, Upton (GB); Vallabh Chole, Aurangabad (IN); Ankit Goel, Uttar Pradesh (IN); Abhishek Karnik, Portland, OR (US)

(73) Assignee: McAfee, LLC, San Jose, CA (US)

( * ) Notice: Subject to any disclaimer, the term of this patent is extended or adjusted under 35 U.S.C. 154(b) by 222 days.

(21) Appl. No.: 17/895,996

(22) Filed: Aug. 25, 2022

(65) Prior Publication Data

US 2024/0073230 A1 Feb. 29, 2024

(51) Int. Cl.
*H04L 9/40* (2022.01)
*H04L 9/00* (2022.01)

(52) U.S. Cl.
CPC .......... *H04L 63/1425* (2013.01); *H04L 63/00* (2013.01); *H04L 63/1416* (2013.01); *H04L 9/00* (2013.01); *H04L 9/40* (2022.05)

(58) Field of Classification Search
CPC ......... H04L 9/00; H04L 9/40; H04L 63/1425; H04L 63/00; H04L 63/1416
See application file for complete search history.

(56) References Cited

U.S. PATENT DOCUMENTS

| 7,490,353 | B2 * | 2/2009 | Kohavi | G06F 21/51 |
| | | | | 713/193 |
| 11,621,855 | B2 * | 4/2023 | Lee | H04L 9/0869 |
| | | | | 713/176 |
| 2015/0356524 | A1 * | 12/2015 | Pennanen | G06Q 20/367 |
| | | | | 705/71 |
| 2017/0206353 | A1 * | 7/2017 | Jai | G06F 21/565 |
| 2020/0296093 | A1 * | 9/2020 | Hoyos | H04L 9/3247 |
| 2021/0105142 | A1 * | 4/2021 | Lee | H04L 9/3247 |
| 2022/0101326 | A1 * | 3/2022 | Kim | G06Q 20/4016 |
| 2023/0412363 | A1 * | 12/2023 | Bucu | H04L 9/0819 |

FOREIGN PATENT DOCUMENTS

| KR | 20210014155 A | * | 2/2021 | .......... H04L 9/3226 |
| WO | WO-2022114413 A1 | * | 6/2022 | .......... G06Q 20/401 |

OTHER PUBLICATIONS

"TAU Threat Discovery: Cryptocurrency Clipper Malware Evolves"—Andrew Costis, Threat Analysis Unit, VMWare, Jul. 24, 2020 https://blogs.vmware.com/security/2020/07/tau-threat-discovery-cryptocurrency-clipper-malware-evolves.html (Year: 2020).*
"KryptoCibule: The Multitasking Multicurrency Cryptostealer"—Faou et al., We Live Security, ESET Research, Sep. 2, 2020 https://www.welivesecurity.com/2020/09/02/kryptocibule-multitasking-multicurrency-cryptostealer/ (Year: 2020).*

* cited by examiner

*Primary Examiner* — Randy A Scott

(74) *Attorney, Agent, or Firm* — Patent Capital Group

(57) ABSTRACT

A method includes determining first data stored in a clipboard of an operating system, determining second data is stored in the clipboard, performing a comparison of the second data against malicious data, at least in part based on a determination that the first data has changed to the second data, and performing a first security operation, at least in part based on the comparison.

17 Claims, 4 Drawing Sheets

Subject: Help Ukraine

Stand with the people of Ukraine. Now accepting cryptocurrency donations. Bitcoin, Ethereum, and USDT.

BTC: bc0357a3Sc2Akf7EkgvP18osJFerwAPjs

ETH and USDT (ERC-20) - 0x165C0909b0a9F02060b7976BABE4e2faa42CB35c

TRX and ESDT (TRC20) - TYJpBKHzef86fmPBgl98Y7Fwwoz6WZa5Rx

It's an Official Ukraine Government request for help and crypto wallets. You can verify on a search engine.

The people of Ukraine are grateful for the support and donations from the global crypto community as we protect our freedom. We are now accepting Polkadot and Litecoin donations too:

$DOT: 1z8aa2N2Ar9SQweJv9vsuZn3WYDHu7gMQu1RePjZyBe33Hv $LTC: LM3LVAuGQQSyfRtHxz8hMjKJqLmb
More cryptocurrencies to be accepted soon. Every bitcoin counts.

Crypto community continue to support Ukraine.
This will certainly contribute to the Ukrainian victory as well as support civil people. We will win - the best people with us.

FIG. 1A

FIG. 1B

```
###Proof of Concept

Monitoring Clipboard

Malicious wallet found in cloud DB
Replacing contents with
Malicious data has been found in your clipboard Malicious wallet found
Replacing contents with
Malicious data has been found in your clipboard
```

IDENTIFICATION OF MALICIOUS CONTENT IN OPERATING SYSTEM CLIPBOARD

BACKGROUND

Technical Field

This disclosure relates to user-generated data transfer and, in particular, to identifying malicious content in the clipboard of a computer operating system.

Related Art

Many computer operating systems (OSes) include a clipboard that temporarily stores data. For example, a user can select text in one application program, copy the text into the OS clipboard, and paste the copied text from the clipboard into a different application program. Thus, a user of the OS can use the stored data in the clipboard without re-generating the data (e.g., re-typing the text).

Recently, cryptocurrencies (sometimes called "crypto") have become popular. A cryptocurrency is a digital currency for exchanging value through a computer network. Many cryptocurrencies operate independently of a centralized authority and can allow users to participate pseudonymously, if not anonymously. Examples of cryptocurrencies include BitCoin, Litecoin, DogeCoin, Polkadot, Tether (USDT), and Tronix (TRN). Tether is based on Ethereum.

This participation is achieved partly through public and/or private key encryption (hence, the "crypto" portion of the name). These keys are commonly stored in a wallet that can be implemented in software, hardware, and/or on the cloud.

BRIEF SUMMARY

A method includes determining first data stored in a clipboard of an operating system, determining second data is stored in the clipboard, performing a comparison of the second data against malicious data, at least in part based on a determination that the first data has changed to the second data, and performing a first security operation, at least in part based on the comparison.

BRIEF DESCRIPTION OF THE SEVERAL VIEWS OF THE DRAWINGS

FIGS. 1A and 1B depict exemplary solicitations for donations to addresses of crypto currency wallets.

DETAILED DESCRIPTION

Figure 2A:
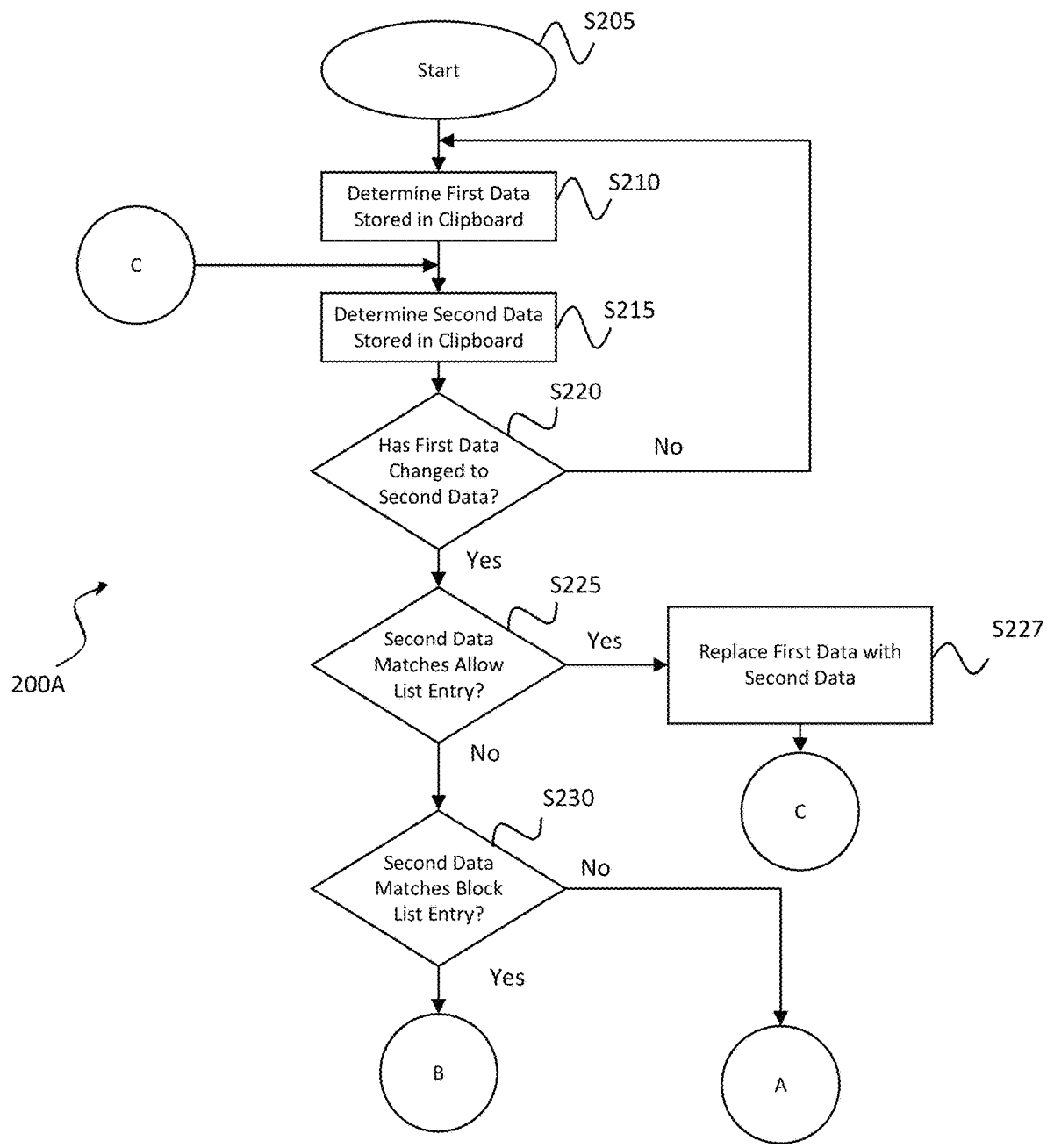
FIGS. 2A and 2B depict an algorithm, according to various implementations of the present disclosure.

Various implementations according to this disclosure utilize information stored on the clipboard as a mechanism for fraud identification.

For purposes of illustrating the present innovation, it might be useful to understand phenomena relevant to various implementations of the disclosure. The following foundational information can be viewed as a basis from which the present disclosure can be explained. Such information is offered for purposes of explanation only and, accordingly, should not be construed to limit the scope of the present disclosure and its potential applications.

Crypto wallets are identified by addresses formed by lengthy strings (e.g., of greater than 20 characters) including capital and lowercase letters, as well as numbers. Due to this length and complexity, it is difficult for users to memorize and accurately type out the address of a crypto wallet.

Accordingly, a user who wants to transfer funds to a crypto wallet typically first copies the address of the crypto wallet to which they want to transfer the funds. This copying places the wallet address into the OS clipboard. The user then pastes that address from the OS clipboard into an online form of an ecommerce vendor or payment processor that processes the crypto currency payment.

Recently, malicious actors have taken advantage of the complexity of crypto wallet addresses by creating websites and emails soliciting donations to illegitimate crypto wallet addresses.

FIGS. 1A and 1B depict exemplary solicitations for donations to addresses of crypto currency wallets. The solicitation in FIG. 1A is an example of a spam email. The solicitation in FIG. 1B is a legitimate tweet. To entice donations, both solicitations select a cause for which recipients might be sympathetic. Thus, both solicitations request donations to addresses of crypto currency wallets in support of resistance by Ukraine.

The spam email depicted in FIG. 1A includes an address of a crypto wallet linked to a private user or private organization. In other words, the crypto currency wallet is not accessible by the official Ukrainian government. Rather, the crypto wallet address is part of a scam perpetrated by the private user or organization.

In contrast, the tweet in FIG. 1B originates from the official Twitter account of the Ukrainian government. This tweet requests donations to an address of a crypto wallet accessible by the Ukrainian government. Accordingly, this crypto wallet address is deemed legitimate.

However, the crypto wallet addresses are pseudonymous. Thus, a user typically cannot identify the owner of a crypto wallet address used for scams (as in FIG. 1A) and the owner of a crypto wallet address used by a charitable cause (as in FIG. 1B). It would be difficult for the user to identify the owners of the wallets by just looking at the addresses of the wallets.

Thus, some devices and/or processes implementing the present disclosure monitor the contents of the OS clipboard to identify a crypto wallet address used for a scam.

Further, some implementations can identify URLs copied to the OS clipboard. Such URLs can serve malicious code to users.

If a device and/or process identifies such malicious contents, the device and/or process can alert a user. The device and/or process also can modify the contents of the OS clipboard to remove the malicious content. Thus, the user can be inhibited from sending a payment to a scam address or from accessing a malicious URL. This implementation will prevent users from losing large amounts of cryptocurrency by sending funds to wallets in such scams. The teachings of the present disclosure are expected to become increasingly relevant, as the use of cryptocurrency increases over time.

Some implementations use a local database of known malicious strings, such as addresses of crypto currency wallets or URLs hosting malicious code.

Further, some implementations can run heuristics against the contents of the OS clipboard. If the heuristics identify the contents of the clipboard as suspicious, the implementations can query a cloud database with the contents of the clipboard. Thus, the implementations can avoid possibly wasting bandwidth and incurring delays by querying the cloud database every time the contents of the OS clipboard change.

As discussed later, a proof-of-concept implementation identified strings representing addresses of scam crypto wallets copied into the OS clipboard. The proof-of-concept then alerted the user and modified the content of the OS clipboard.

Figure 2B:
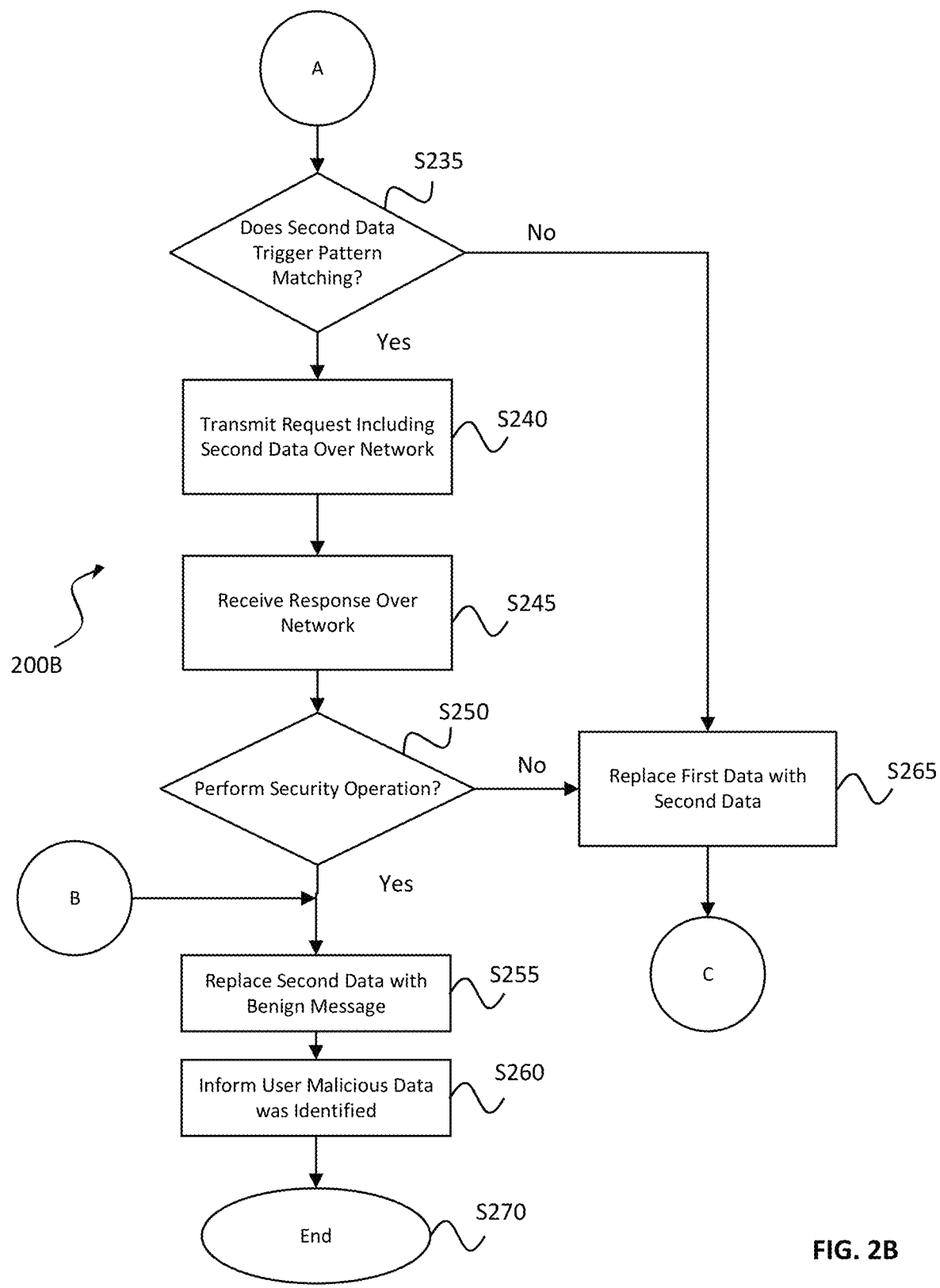

FIGS. 2A-2B depict an algorithm 200A, 200B, according to various implementations of the present disclosure.

In S205, the algorithm 200A begins. The algorithm 200A then advances to S210.

In S210, the processor determines first data stored in the clipboard of the OS. For example, the processor determines the content stored in the OS clipboard at the time of execution of S210. The algorithm 200A then advances to S215.

In S215, the processor determines that second data is stored in the clipboard. In many implementations, the processor can perform this determination by a call. For example, the processor can execute a known function in the Python programming language or in an application programming interface (API) in Microsoft Windows.

In additional implementations, the processor can perform this determination based on intercepting particular keyboard combinations, such as control-C or control-X. Such combinations can be defined by the OS or by a user within a shell of the OS. In some implementations, a single keystroke can copy or cut the second data into the OS clipboard. Similarly, the processor can perform this determination based on intercepting graphical menu selections to copy or cut data to the clipboard. Another such selection can occur via a context menu presented based on a right-click on a mouse. Determinations as to the storage of the second data can occur at the hardware level, the firmware level, or the software level of the system. The algorithm 200A then advances to S220.

In S220, the processor determines whether the first data in the clipboard has changed to the second data. For example, the processor determines if the first data is the same as the second data. If the processor determines that the first data has not changed to the second data, then the algorithm 200A returns to S210. On the other hand, if the processor determines the first data has changed to the second data in the OS clipboard, the algorithm 200A then advances to S225. Thus, the algorithm 200A can avoid unnecessary processing when a copy or cut operation does not change the content of the OS.

In S225, the processor performs a comparison of the second data to benign data. The benign data can be, for example, an address of a cryptocurrency wallet known to be legitimate (e.g., an account of the user) or a URL known to be legitimate (e.g., of a well-known company, such as at www.mcafee.com).

In many implementations, the benign data is an entry on a list of allowed data. Thus, in various implementations, the processor can compare the second data to two or more (e.g., each) of the entries in the list of allowed data.

If the processor determines the second data matches (e.g., is the same as) the benign data, then the algorithm 200A replaces the first data with the second data in S227 and returns to S215. On the other hand, if the processor determines the second data does not match (e.g., is the same as) the benign data, then the algorithm 200A advances to S230.

Advantageously, by returning to S215 if the second data matches the benign data, the algorithm 200A can avoid additional processing of the second data. Thus, the algorithm 200A can conserve processing and network bandwidth resources.

In S230, the processor compares the second data against illegitimate data. The illegitimate data can be, for example, an address of a cryptocurrency wallet known to be illegitimate (e.g., an account of a scammer or scamming group) or a URL known to host malicious content or code, such as viruses.

In many implementations, the illegitimate data is an entry on a list of blocked data. Thus, in various implementations, the processor can compare the second data to two or more (e.g., each) of the entries in the list of blocked data.

If the processor determines the second data does not match (e.g., is not the same as) the illegitimate data, then the algorithm 200A advances via off-page connector A to S235 in algorithm 200B. On the other hand, if the processor determines the second data does match (e.g., is the same as) the malicious data, then the algorithm 200B then advances via off-page connector B to S255 in algorithm 200B.

In S235, the processor determines whether the second data triggers pattern matching. That is, the processor can execute one or more heuristics rules against the second data.

In one example, the processor can use a heuristic rule to determine whether the second data represents a URL. For example, the processor can determine whether the second data begins with "http", "https", or "ftp" followed by "://". The processor can also determine whether the string begins with "www." In addition, the processor can compare the second data against a list of top-level domains (e.g., ".com", ".co.uk", or ".org") or an Internet Protocol version. The system can update this heuristic rule over time, as the Internet Assigned Numbers Authority (IANA) and Internet Corporation for Assigned Names and Numbers (ICANN) add and/or recognize further top-level domains and/or as Internet Protocol versions.

In another example, the processor can use a heuristic rule to determine whether the second data represents an address of a cryptocurrency wallet, such as by comparing the second data against one or more rules dictating the format of the address of the cryptocurrency wallet.

Crypto wallet addresses follow an alphanumeric pattern that can be identified using regular expression (regex) pattern matching provided by most computer languages.

For example, for BitCoin, the following regex can be used: bc[0-13]{1}([A-HJ-NP-Za-km-z1-9]{39}|[ac-hj-np-z02-9]{39}|[ac-hj-np-z02-9]{59}|[ac-hj-np-z02-9]{87}|[a-km-zA-HJ-NP-Z1-9]{35}). For Ethereum wallets, the address can start with ox and include 40 characters of a-f, A-F, and 0-9. For Litecoin, the regex can be [LM3][a-km-zA-HJ-NP-Z1-9]{26,33}. For DogeCoin, the regex can be D{1}[5-9A-HJ-NP-U]{1}[1-9A-HJ-NP-Za-km-z]{32}.

In the above regular expressions, individual characters indicate the character must be present. For example, a BitCoin address in accordance with the above regex begins with the characters "bc".

Square brackets define a token of values. Within a token, a dash indicates a range of the values. Further, curly brackets indicate a quantifier of the number of characters according to the preceding token. Thus, [0-13]{1} indicates that one character is selected from (i) values ranging between 0 and 1 or (ii) the value 3. That is, acceptable values for this character are 0, 1, and 3: the value 2 is not acceptable.

Multiple quantifiers offer alternative numbers of characters. For example, {26,33} indicates that either 26 characters or 33 characters from the preceding token can be used.

Pipes indicate alternatives. For example, [1-4]{5}|[x-z]{6} indicates that acceptable values include five characters ranging from 1-4 (e.g., 12341) or six characters ranging from x-z (e.g., xzxzzz).

Parentheses are used to group several patterns together.

Thus, a simple example of a regular expression is [a-d]{3}([1-4]{5}|[x-z]{5}). Here, a matching expression begins with 3 characters ranging from a to d, followed by 5 characters ranging from 1-4 or from x-z. The "or" in this case is exclusive: the 5 characters cannot include both values ranging from 1-4 and values ranging from x-z.

Thus, abc12444 matches this regular expression. Here, the first three characters, abc, are within the range a-d. Further, the next five characters, 12444, range from 1-4.

Likewise, abczzxxx matches this regular expression. Here, the first three characters, abc, again are within the range a-d. Further, the next five characters, zzxxx, range between x-z.

On the other hand, abcaaxxx does not match this regular expression. Specifically, the first two characters of aaxxx is not between x-z.

Further, a1czzxxx does not match this regular expression. Here, the three characters in abc are not all between a-c. Specifically, the character 1 is not within the dictated range.

The regular expressions set forth above are exemplary and non-limiting. Other regular expressions can be used for the listed cryptocurrencies. In addition, other cryptocurrencies can use the same or different regular expressions. Similarly, an exchange or broker can follow its own regular expressions in establishing wallets for accounts serviced by the exchange.

Thus, as discussed above, these rules can define, for example, a minimum and/or maximum number of characters. The rules also can define that character positions within the address have a specified number of values to indicate, for example, a particular currency, broker, and/or exchange. As standards for addresses of cryptocurrency wallets are proposed and/or adopted, the rules can reflect these standards, in various implementations of the present disclosure. Thus, the system can update these heuristic rules over time, as entities, such as currencies, brokers, and/or exchanges, propose and/or adopt formats and/or standards for cryptocurrency wallet addresses.

In select implementations, the processor can execute the heuristic rules to determine whether the second data is suspicious and that further examination of the second data is performed. For example, the processor can execute the heuristic rules to determine whether the cloud can access suitable data for analyzing the second data. As discussed above, these rules can be updated, such as by definitions provided by the cloud. Thus, if the processor determines the second data triggers the pattern matching, then the algorithm 200B advances to S240.

On the other hand, the processor can execute the heuristic rules to determine the first data in the OS clipboard is to be replaced with the second data. Thus, if the processor determines the second data does not trigger the pattern matching, then the algorithm 200B advances to S265.

In S240, the processor instructs a network interface of the system to transmit the second data to a predetermined computer, such as a server, in the cloud. The algorithm 200B then advances to S245. The address of the predetermined computer can also be updated by definitions.

Such a server can be operated by a security vendor, such as McAfee, LLC. The server can compare the received second data against entries in a cloud database to produce a result. The result identifies whether the second data matches a benign entry or a malicious entry in the cloud database. The server then transmits a response including the result.

In S245, the network interface of the system receives the response transmitted by the server. The algorithm 200B then advances to S250.

In S250, the processor determines whether to perform a security operation, based on the result included in the response. For example, the processor can determine to perform the security operation, if the result indicates the second data matches a malicious entry in the cloud database. If the processor determines to perform the security operation, then the algorithm 200B advances to S255.

On the other hand, if the response indicates the second data matched a benign entry or did not match an entry in the cloud database, then the processor determines not to perform the security operation. In this case, the algorithm 200B advances to S265.

In S255, the processor replaces the second data in the OS clipboard with a benign message. In one non-limiting example, the benign message is "Malicious data has been found in your clipboard." The algorithm 200B then advances to S260.

In S260, the processor can inform a user that malicious data was identified in the OS clipboard. The content of the informing can indicate whether the second data included an address of an illegitimate cryptocurrency wallet or a malicious URL. For example, the content can include "Malicious wallet found" or "Malicious URL found."

The content of the informing also can indicate whether the processor determined in S230 the second data matched an entry on the block list. For example, the content can include "Malicious wallet found locally." Further, the content of the notification can also indicate whether the result received from the cloud in S240 indicates the second data matched a malicious entry in the cloud database. For example, the content can include "Malicious wallet found in cloud database."

Various implementations provide this content in different manners. For example, in one implementation, the processor instructs a display to display the content possibly in addition to a visual indicator, like a stop sign. In other implementations, the processor can instruct a speaker to play a voice explaining the content. Alternatively or additionally, the processor can instruct the speaker to play an audio an audio alert, such as an error sound.

In some implementations, the processor can instruct a haptic feedback device to signal the notification. For example, the signal provided by the haptic feedback device can be a strong, short buzz to signal disagreement. The algorithm 200B then advances to S270.

Returning to S265, the processor replaces the first data in the OS clipboard with the second data. The algorithm 200B then advances via off-page connector C to S215.

In S270, the algorithm 200B ends.

Figures 3, 4:
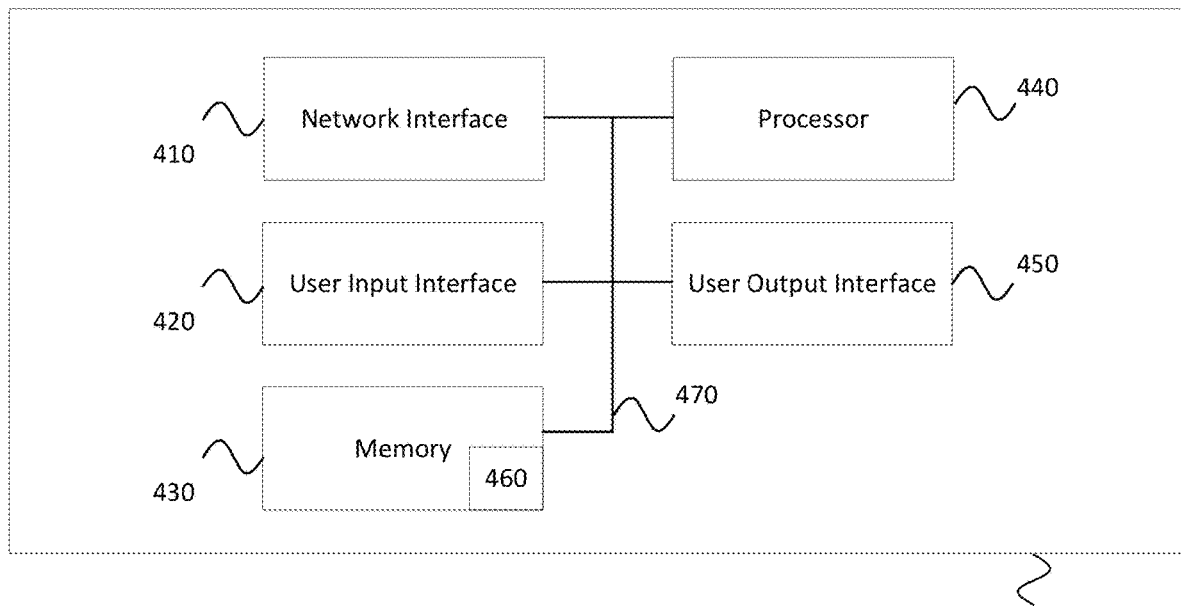
FIG. 3 depicts a proof-of-concept, according to various implementations of the present disclosure.
FIG. 4 illustrates a computing device, according to an implementation of the present disclosure.

FIG. 3 depicts a proof-of-concept, according to an implementation of the present disclosure.

In a first example, an address of a BitCoin wallet was copied to the OS clipboard. The processor identified the wallet by a heuristic rule in S235. The address was transmitted and compared against an entry in a cloud database. The cloud database identified the BitCoin wallet address as malicious. Thus, the contents of the clipboard were changed in S255 to protect the user.

In a second example, a string was copied to the OS clipboard. The processor identified the string locally in S230. Thus, the processor changed the contents of the clipboard in S255 to protect the user.

In the implementations discussed above, the processor compares the entirety of the clipboard content against a malicious string, such as an address of a crypto currency wallet. In other implementations, a portion of the clipboard content can be compared against the malicious string. That is, a user cannot avoid detection by the algorithm, such as by copying one character more than the address of a crypto currency wallet, whether advertently or not.

Similarly, in some implementations, the processor can compare the clipboard content against a portion of the malicious string. In this case, a user cannot avoid detection, such as by simply copying one character less than the address of a crypto currency wallet, again whether advertently or not.

Thus, some implementations compare a predetermined threshold of the OS clipboard (e.g., an absolute number of characters, a percentage of the data in the clipboard) against a predetermined threshold of the malicious string (e.g., an absolute number of characters, a percentage of data in the string).

Accordingly, some implementations embrace aspects of fuzzy computing.

In the algorithm illustrated in FIGS. 2A-2B, the same operations S255 and S260 are performed, following operations S230 and S250. In select implementations, different operations can be performed in S255 and S260, depending on whether those operations are reached via S230 or via S250. For example, the text in the clipboard can differ in S255. Further, the informing in S260 can differ, as discussed with regard to FIG. 3.

FIG. 4 illustrates a computing device 400, according to an implementation of the present disclosure.

Although illustrated within a single housing, the computing device 400 can be distributed across plural housings or sub-systems that cooperate in executing program instructions. In some implementations, the computing device 400 can include one or more blade server devices, standalone server devices, personal computers (including laptop computers and tablet computers), routers, hubs, switches, bridges, firewall devices, intrusion detection devices, mainframe computers, network-attached storage devices, video game systems, smartphones and other mobile telephones, and other computing devices. The computing device 400 can execute the Windows® operating system (OS), Linux OS, or Android OS in many implementations. The hardware of the computing device 400 can be configured according to a Symmetric Multi-Processing (SMP) architecture or a Non-Uniform Memory Access (NUMA) architecture.

The computing device 400 can include a network interface 410 that provides one or more communication connections and/or one or more devices that allow for communication between the computing device 400 and other computing systems (not shown) over a communication network or collection of networks (not shown) or the air. The network interface can communicate using near-field communications (NFC), Wi-Fi™, Bluetooth, Ethernet, cellular (e.g., 4G, 5G), facsimile, or any other wired or wireless interface. The network interface 410 is an example of a means for transmitting a request over a network and for receiving a response to the request over the network.

The computing device 400 can also include a user input interface 420 that receives inputs from a human. The user input interface 420 can be or include a mouse, a touchpad, a keyboard, a touchscreen, a trackball, a camera, a microphone, a joystick, a game controller, a scanner, a drawing tablet, or any other input device. The user input interface 420 is an example of a means for receiving a command to add data to the clipboard.

The computing device 400 can include a memory 430, also termed a "storage." The memory 430 can include or be one or more computer-readable storage media readable by a processor 440 and that store software. The memory 430 can be implemented as one storage device and can also be implemented across multiple co-located or distributed storage devices or sub-systems. The memory 430 can include additional elements, such as a memory controller, that communicate with the processor 440. The memory 430 can also include storage devices and/or sub-systems on which data and/or instructions are stored. The computing device 400 can access one or more storage resources to access information (e.g., a program) to carry out any of the processes indicated in this disclosure and, in particular, FIGS. 2A-2B. The memory 430 is an example of a means for storing data in the clipboard. The memory 430 is also an example of a means for storing instructions to be executed by the processor 440.

The memory 430 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 430 can be or include resistive RAM (RRAM) or a magneto-resistive RAM (MRAM). Other implementations are possible.

An OS clipboard content identification program 460 stored in memory 430 can include routines for at least partially performing at least one of the processes illustrated in FIGS. 2A-2B and can be implemented in program instructions. Further, the software, when executed by the computing device 400 in general or the processor 440 specifically, can direct, among other functions, the computing device 400 or the processor 440 to perform the methodology for identifying malicious content in the OS clipboard, as described herein.

The computing device 400 can include the processor 440 (e.g., a processing unit). The processor 440 can perform the operations disclosed by the present specification. Thus, the processor 440 is an example of a means for determining first data stored in a clipboard of an operating system, for determining second data is stored in the clipboard, for performing a comparison of the second data against malicious data, at least in part based on a determination that the first data has changed to the second data, and/or for performing a first security operation, at least in part based on the comparison. The processor 440 also is an example of a means for determining whether the second data triggers pattern matching, if the second data does not match the malicious data. Further, the processor 440 is an example of a means for replacing, in a memory, the first data with the second data, if the second data does not trigger the pattern matching. In addition, the processor 440 is an example of a means for performing a second security operation, at least in part based on the response.

The processor 440 can be or include one or more hardware processors and/or other circuitry that retrieve and execute software from the memory 430. The processor 440 can be implemented within one processing device, chip, or package and can also be distributed across multiple processing devices, chips, packages, or sub-systems that cooperate in executing program instructions. In some implementations, the processor 440 is or includes a Graphics Processing Unit (GPU).

The processor 440 can have any register size, such as a 32-bit register or a 64-bit register, among others. The processor 440 can include multiple cores. Implementations of the processor 440 are not limited to any particular number of threads. The processor 440 can be fabricated by any process technology, such as 14 nm process technology.

The computing device 400 can also include a user output interface 450 that outputs information to a human user. The user output interface 450 can be or include one or more displays (e.g., a screen, goggles), a touchscreen, speakers, a printer, or a haptic feedback unit. In many implementations, the user output interface 450 can be combined with the user input interface 420 to include, for example, a touchscreen or a headset including headphones and a microphone. The user output interface 450 is an example of a means for informing a user that malicious data was identified.

The computing device 400 also includes a bus 470. The components of computing device 400 can communicate with other components, whether pictured or unpictured, via the bus 470.

In implementations including multiple computing devices, a server of the system or, in a serverless implementation, a peer can use one or more communications networks that facilitate communication among the computing devices. For example, the one or more communications networks can include or be a local area network (LAN), a wide area network (WAN), or a metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the system for identifying malicious content in the OS clipboard can be implemented in various manners (e.g., as a method, a system, or a computer-readable storage medium). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various implementations, different operations and portions of the operations of the algorithms described can be performed by different processing units.

Further, aspects of the present disclosure can take the form of a computer program product implemented in one or more computer-readable media having computer-readable program code implemented, e.g., encoded or stored, thereon. The program code can be or include executable instructions. In various implementations, such a computer program can, for example, be downloaded (or updated) to existing devices and systems or be stored upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, particular implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an electronic device. The board can be a general-purpose circuit board that can hold various components of the internal electronic system of the electronic device and, further, provide connectors for other peripherals. More specifically, the board can provide the electrical connections by which other components of the system can communicate electrically. One or more processors (inclusive of digital signal processors, microprocessors, and supporting chipsets) and computer-readable memory elements can be coupled to the board based on configurations, processing demands, and computer designs. Other components such as external storage, additional sensors, controllers for audio/video display, and peripheral devices can be attached to the board as plug-in cards, via cables, or integrated into the board itself.

In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices.

Implementations of the present disclosure can be readily included in a system-on-chip (SOC) package. An SOC represents an integrated circuit (IC) that integrates components of a computer or other electronic system into one chip. The SOC can contain digital, analog, mixed-signal, and radio frequency functions on one chip substrate. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), a programmable logic array (PLA), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to the arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in different manners. Along similar design alternatives, the illustrated components, modules, and elements of the drawings can be combined in various possible configurations within the scope of this disclosure. In some cases, it is clearer to describe one or more of the functionalities of a given set of flows by referencing a reduced number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, operations, characteristics, etc.) included in "at least one implementation," "example implementation," "select implementations," "another implementation," "some implementations," "various implementations," "other implementations," "multiple implementations," and the like are intended to mean that any such features are included in one or more implementations of the present disclosure and might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example M1, a method includes determining first data stored in a clipboard of an operating system; determining second data is stored in the clipboard; performing a comparison of the second data against malicious data, at least in part based on a determination that the first data has changed to the second data; and performing a first security operation, at least in part based on the comparison.

Example M2 is the method of Example M1, further comprising: determining whether the second data triggers pattern matching, if the second data does not match the malicious data; and transmitting a request over a network, if the second data triggers the pattern matching, the request identifying the second data.

Example M3 is the method of Example M2, further comprising: replacing, in a memory, the first data with the second data, if the second data does not trigger the pattern matching.

Example M4 is the method of Example M2, further comprising: receiving a response to the request over the network; and performing a second security operation, at least in part based on the response.

Example M5 is the method of one of Examples M1-M4, wherein the first security operation is performed, if the second data matches the malicious data.

Example M6 is the method of one of Examples M1-M5, wherein the first security operation includes replacing the second data in the clipboard with a benign message or informing a user that the malicious data was identified in the clipboard.

Example M7 is the method of one of Examples M1-M6, wherein the comparison is performed, if the second data does not match benign data.

In Example C1, a non-transitory, computer-readable medium is encoded with executable instructions that, when executed by a processing unit, perform operations comprising: determining first data stored in a clipboard of an operating system; determining second data is stored in the clipboard; performing a comparison of the second data against malicious data, at least in part based on a determination that the first data has changed to the second data; and performing a first security operation, at least in part based on the comparison.

Example C2 is the medium of Example C1, the operations further comprising: determining whether the second data triggers pattern matching, if the second data does not match the malicious data; and transmitting a request over a network, if the second data triggers the pattern matching, the request identifying the second data.

Example C3 is the medium of Example C2, the operations further comprising: replacing, in a memory, the first data with the second data, if the second data does not trigger the pattern matching.

Example C4 is the medium of Example C2, the operations further comprising: receiving a response to the request over the network; and performing a second security operation, at least in part based on the response.

Example C5 is the medium of one of Examples C1-C4, wherein the first security operation is performed, if the second data matches the malicious data.

Example C6 is the medium of one of Examples C1-C5, wherein the first security operation includes replacing the second data in the clipboard with a benign message or informing a user that the malicious data was identified in the clipboard.

Example C7 is the medium of one of Examples C1-C6, wherein the comparison is performed, if the second data does not match benign data.

In Example A1, an apparatus includes: a memory including instructions; and a processor configured to execute the instructions to determine first data stored in a clipboard of an operating system, to determine second data is stored in the clipboard, to perform a comparison of the second data against malicious data, at least in part based on a determination that the first data has changed to the second data, and to perform a first security operation, at least in part based on the comparison.

Example A2 is the apparatus of Example A1, further comprising: a network interface that transmits a request over a network, if the second data triggers a pattern matching, the request identifying the second data, wherein the processor further is configured to execute the instructions to determine whether the second data triggers the pattern matching, if the second data does not match the malicious data.

Example A3 is the apparatus of Example A2, wherein the processor further is configured to execute the instructions to replace, in a memory, the first data with the second data, if the second data does not trigger the pattern matching.

Example A4 is the apparatus of Example A2, wherein the network interface receives a response to the request over the network, and the processor further is configured to execute the instructions to perform a second security operation, at least in part based on the response.

Example A5 is the apparatus of one of Examples A1-A4, wherein the first security operation is performed, if the second data matches the malicious data.

Example A6 is the apparatus of one of Examples A1-A5, wherein the first security operation includes replacing the second data in the clipboard with a benign message or informing a user that the malicious data was identified in the clipboard.

Example A7 is the apparatus of one of Examples A1-A6, wherein the comparison is performed, if the second data does not match benign data.

In Example F1, an apparatus includes means for determining first data stored in a clipboard of an operating system, for determining second data is stored in the clipboard, for performing a comparison of the second data against malicious data, at least in part based on a determination that the first data has changed to the second data, and for performing a first security operation, at least in part based on the comparison.

Example F2 is the apparatus of Example F1, further comprising: means for determining whether the second data triggers pattern matching, if the second data does not match the malicious data, and for transmitting a request over a network, if the second data triggers the pattern matching, the request identifying the second data.

Example F3 is the apparatus of Example F2, further comprising: means for replacing, in a memory, the first data with the second data, if the second data does not trigger the pattern matching.

Example F4 is the apparatus of Example F2, wherein the means for transmitting receives a response to the request over the network, the apparatus further comprising: means for performing a second security operation, at least in part based on the response.

Example F5 is the apparatus of one of Examples F1-F4, wherein the first security operation is performed, if the second data matches the malicious data.

Example F6 is the apparatus of one of Examples F1-F5, wherein the first security operation includes replacing the second data in the clipboard with a benign message or informing a user that the malicious data was identified in the clipboard.

Example F7 is the apparatus of one of Examples F1-F6, wherein the comparison is performed, if the second data does not match benign data.

We claim:

1. A method, comprising:
performing a comparison of copied data against a cryptocurrency wallet address, upon determining that content of a clipboard of an operating system is to be replaced with the copied data;
determining whether the copied data triggers pattern matching, in response to a determination that the copied data does not match the cryptocurrency wallet address;
transmitting a request identifying the copied data over a network, if the copied data triggers the pattern matching;
receiving a response to the request over the network, the response including a result identifying whether the copied data matches benign data or malicious data; and
performing a security operation including replacing the copied data in the clipboard, if the copied data matches the cryptocurrency wallet address, and informing a user that the copied data is malicious, if the response identifies that the copied data matches the malicious data.

2. The method of claim 1, wherein the security operation replaces the copied data in the clipboard with a benign message.

3. The method of claim 1, wherein the comparison is performed, if the copied data does not match benign data.

4. The method of claim 1, wherein the security operation informs the user that the cryptocurrency wallet address was identified in the clipboard.

5. The method of claim 1, wherein the determination is based on intercepting a key combination or a graphical menu selection.

6. The method of claim 1, wherein the pattern matching is based on a regular expression for a cryptocurrency.

7. A non-transitory, computer-readable medium encoded with executable instructions that, when executed by a processing unit, perform operations comprising:
performing a comparison of copied data against a cryptocurrency wallet address, upon determining that content of a clipboard of an operating system is to be replaced with the copied data;
determining whether the copied data triggers pattern matching, in response to a determination that the copied data does not match the cryptocurrency wallet address;
transmitting a request identifying the copied data over a network, if the copied data triggers the pattern matching;
receiving a response to the request over the network, the response including a result identifying whether the copied data matches benign data or malicious data; and
performing a security operation including replacing the copied data in the clipboard, if the copied data matches the cryptocurrency wallet address, and informing a user that the copied data is malicious, if the response identifies that the copied data matches the malicious data.

8. The medium of claim 7, wherein the security operation replaces the copied data in the clipboard with a benign message.

9. The medium of claim 7, wherein the security operation informs the user that the cryptocurrency wallet address was identified in the clipboard.

10. The medium of claim 7, wherein the determination is based on intercepting a key combination or a graphical menu selection.

11. The medium of claim 7, wherein the pattern matching is based on a regular expression for a cryptocurrency.

12. An apparatus, comprising:
a memory including instructions;
a processor configured to execute the instructions to perform a comparison of copied data against a cryptocurrency wallet address, upon determining that content of a clipboard of an operating system is to be changed to replaced with the copied data, and to determine whether the copied data triggers pattern matching, in response to a determination that the copied data does not match the cryptocurrency wallet address; and a network interface that transmits a request identifying the copied data over a network, if the copied data triggers the pattern matching, and receives a response to the request over the network, the response including a result identifying whether the copied data matches benign data or malicious data, wherein the processor further is configured to execute the instructions to perform a security operation, including replacing the copied data in the clipboard, if the copied data matches the cryptocurrency wallet address, and informing a user that the copied data is malicious, if the response identifies that the copied data matches the malicious data.

13. The apparatus of claim 12, wherein the security operation replaces the copied data in the clipboard with a benign message.

14. The apparatus of claim 12, wherein the comparison is performed, if the copied data does not match benign data.

15. The apparatus of claim 12, wherein the security operation informs the user that the cryptocurrency wallet address was identified in the clipboard.

16. The apparatus of claim 12, wherein the determination is based on intercepting a key combination or a graphical menu selection.

17. The apparatus of claim 12, wherein the pattern matching is based on a regular expression for a cryptocurrency.

* * * * *